Patented July 24, 1951

2,561,468

UNITED STATES PATENT OFFICE 2,561,468 p-N-MONO- AND DISUBSTITUTED AMINO-HYDROXYALKYLBENZOATES AND PROCESSES OF PRODUCING SAME

Herbert H. Guest, West Hartford, Conn., assignor to The J. B. Williams Company, Glastonbury, Conn., a corporation of Connecticut No Drawing. Application June 16, 1949, Serial No. 99,584

8 Claims. (Cl. 260—472)

This invention relates to p-N-mono and di substituted amino-hydroxyalkylbenzoates and more particularly to p-N-mono and di substituted amino-hydroxyalkylbenzoates in which the substituent or substituents are hydroxyalkyl radicals and which, when applied to the skin, prevent the absorption of harmful blistering rays of sunlight.

Many compositions have heretofore been proposed which have the property of screening or absorbing harmful blistering rays of sunlight. Some of these compositions transform ultraviolet rays of wave-lengths shorter than approximately 3300 ångstrom units into non-burning rays longer than 3300 ångstrom units. These longer rays produce tanning of the skin without painful burning. While some of these compositions, such as certain esters of p-aminobenzoic acid, are effective in the transformation of the ultraviolet light rays to rays of longer wave-length, such esters are not soluble in water and many of them have anesthetic or numbing effects on the skin. The substantial water insolubility of these esters, such as the butyl ester which has a solubility of 0.0014 gram in 100 milliliters of water, prevents the use of them as effective media for preventing serious sunburn, because it is essential that a continuous film of the composition be deposited on the skin after the solvent or dispersing agent has evaporated and, if such esters are emulsified with the water, the film left on evaporation is not continuous but the ester becomes crystallized or agglomerated. Although some of these esters are soluble in alcohol, an alcohol solution is undesirable for general use as a sun screening lotion, especially for sore or tender skin. Because of their physical characteristics, such esters are not adapted for use in a sun screening lotion.

In accordance with this invention, compositions are provided which are water soluble, which are not anesthetic, which are odorless and which are most potent in sun screening even when applied in low concentrations in a liquid solvent, such as water. These compositions filter out to a maximum degree the harmful blistering rays of sunshine. The compositions of this invention have the following formula:

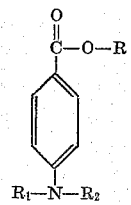

in which R is either the 2-hydroxyethyl or the 2-hydroxypropyl radical, $R_1$ is either the 2-hydroxyethyl or the 2-hydroxypropyl radical, while $R_2$ is hydrogen, the 2-hydroxyethyl radical or the 2-hydroxypropyl radical.

The compositions of this invention are produced by reacting p-aminobenzoic acid with an alkylene oxide having more than one and less than four carbon atoms, or more particularly, with either ethylene oxide or propylene oxide. Alternatively, the p-aminobenzoic acid may be reacted with a mixture of ethylene oxide and propylene oxide. The reaction which takes place is illustrated by the following typical structural representation which shows the reaction of p-aminobenzoic acid with ethylene oxide:

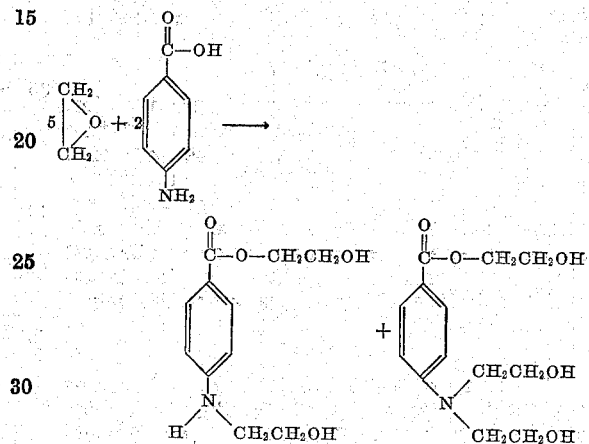

This reaction shows the production of both 2-hydroxyethyl-p-2-hydroxyethylaminobenzoate and 2-hydroxyethyl-p-di(2-hydroxyethyl) aminobenzoate, but if it is desired to produce predominantly 2-hydroxyethyl-p-2-hydroxyethylaminobenzoate or 2-hydroxyethyl-p-di-(2-hydroxyethyl) aminobenzoate, the proportions may be regulated to effect the predominant production of the desired product. In like manner, 2-hydroxypropyl-p-2-hydroxypropylaminobenzoate or 2-hydroxypropyl-p-di(2-hydroxypropyl)-aminobenzoate is produced except that instead of employing ethylene oxide, propylene oxide is reacted with the p-aminobenzoic acid. Desirably, a catalyst, such as sodium hydroxide, is employed in the reaction.

For use as a sun-tan lotion, the compositions of this invention may be dissolved in a suitable inert solvent, such as water. Concentrations of 1 to 3% of the ester in water are satisfactory for this purpose. Other ingredients, such as essential oils to impart a desired odor to the lotion or therapeutic substances to produce certain desired effects, or other sunburn preventatives or humectants, may, if desired, be also included in the sun-tan lotion of this invention.

To effect the production of the compositions of this invention, it is desirable to react 2 to 8 mols, and preferably 3 to 6 mols, of the alkylene oxide per mol of p-aminobenzoic acid. If it is desired to produce a reaction product containing predominant amounts of 2-hydroxyethyl-p-di(2-hydroxyethyl) aminobenzoate or 2-hydroxypropyl-p-di(2-hydroxypropyl) aminobenzoate rather than the corresponding N-mono substituted amino derivatives, the molar ratio desirably is 4 to 6 mols of the alkylene oxide per mol of p-aminobenzoic acid.

Examples of catalysts which may be used in the preparation of the compositions are sodium hydroxide, potassium hydroxide or ammonium hydroxide.

A more comprehensive understanding of this invention is obtained by reference to the following examples:

Example 1

20 grams p-aminobenzoic acid, 25 grams water and 35 grams propylene oxide were mixed together. The resulting solution was heated using an efficient reflux condenser at a temperature sufficient to cause continuous but gentle refluxing of the propylene oxide until odor of the propylene oxide had disappeared. This refluxing required a period of about five hours. The solution changed from a brown to a yellow-green color. This resulting solution may be further diluted with 1 to 2 liters of water to form a sun-tan lotion.

Example 2

30 grams p-aminobenzoic acid, 50 grams water, and 2 grams of a 50% sodium hydroxide solution were mixed together. To this mixture was added 40 grams propylene oxide. The solution was heated to refluxing, using a well cooled condenser, for three hours, at which time there was no unaltered propylene oxide. This solution can be used in a sun-tan preparation without further treatment by dilution with water to approximately 2 liters.

Example 3

120 grams p-aminobenzoic acid, 200 grams water and 8 grams of a 50% sodium hydroxide solution were mixed. This mixture was subjected at room temperature (70° F.) to the action of ethylene oxide gas in a suitable pressure vessel (autoclave). When 6 to 8 mols of gas were added, i. e. about 250 grams, the reaction mixture was allowed to stand over night or about 12 hours. The resulting product had completely reacted and was practically free of unaltered ethylene oxide.

The terms and expressions which I have employed are used as terms of description and not of limitation, and I have no intention, in the use of such terms and expressions, of excluding any equivalents of the features described or portions thereof, but recognize that various modifications are possible within the scope of the invention claimed.

What is claimed is:

1. The method of producing a reaction product of p-aminobenzoic acid and an alkylene oxide which comprises reacting in the presence of an alkali metal hydroxide, p-aminobenzoic acid with an alkylene oxide having more than one and less than four carbon atoms in the ratio of 1 mol of p-aminobenzoic acid to 2 to 8 mols of said alkylene oxide.

2. The method of producing a reaction product of p-aminobenzoic acid and an alkylene oxide which comprises reacting in the presence of sodium hydroxide, p-aminobenzoic acid with an alkylene oxide having more than one and less than four carbon atoms in the ratio of 1 mol of p-aminobenzoic acid to 3 to 6 mols of said alkylene oxide.

3. The method of producing a reaction product of p-aminobenzoic acid and ethylene oxide which comprises reacting, in the presence of an alkali metal hydroxide, p-aminobenzoic acid with ethylene oxide in the ratio of 1 mol of p-aminobenzoic acid to 2 to 8 mols of ethylene oxide.

4. The method of producing a reaction product of p-aminobenzoic acid and propylene oxide which comprises reacting, in the presence of an alkali metal hydroxide, p-aminobenzoic acid with propylene oxide in the ratio of 1 mol of p-aminobenzoic acid to 2 to 8 mols of propylene oxide.

5. A reaction product produced by the method of claim 1.

6. A reaction product produced by the method of claim 2.

7. A reaction product produced by the method of claim 3.

8. A reaction product produced by the method of claim 4.

HERBERT H. GUEST.

REFERENCES CITED

The following references are of record in the file of this patent:

UNITED STATES PATENTS

| Number | Name | Date |
|---|---|---|
| 1,022,645 | Taub | Apr. 9, 1912 |
| 1,334,641 | Altwegg et al. | Mar. 23, 1920 |
| 1,418,900 | Altwegg et al. | June 6, 1922 |
| 2,056,656 | Ellis | Oct. 6, 1936 |
| 2,128,334 | Stockelbach | Aug. 30, 1938 |
| 2,274,725 | Meeker | Mar. 3, 1942 |
| 2,327,899 | Isermann | Aug. 24, 1943 |

FOREIGN PATENTS

| Number | Country | Date |
|---|---|---|
| 477,843 | Great Britain | Jan. 3, 1938 |

OTHER REFERENCES

Cretcher: Jour. of the Amer. Chem. Soc., vol. 47, pp. 2560 to 2563 (Oct. 1925). (Copy in Sci. Lib.)

De Navarre: Chemistry and Manufacture of Cosmetics (1941) pp. 592,595. (Copy in Div. 43.)